(12) United States Patent
Kueper et al.

(10) Patent No.: US 6,367,320 B1
(45) Date of Patent: Apr. 9, 2002

(54) PROCESS FOR MONITORING OPERATION OF AN EXHAUST GAS TREATMENT SYSTEM

(75) Inventors: Paul Kueper, Wiernsheim; Stefan Dietrich Peter, Gross-Umstadt; Michael Illek, Stuttgart; Jens Mueller, Rutesheim; Christian Goerigk, Hemmingen; Stefan Wessels, Weissach-Flacht, all of (DE)

(73) Assignees: Dr. Ing. h.c.F. Porsche Aktiengellschaft; AUDi AG; Bayerische Motoren Werke Aktiengesellschaft; DaimlerChrysler AG; Volkswagon AG, all of (DE)

( * ) Notice: Subject to any disclaimer, the term of this patent is extended or adjusted under 35 U.S.C. 154(b) by 0 days.

(21) Appl. No.: 09/578,443

(22) Filed: May 26, 2000

(30) Foreign Application Priority Data

May 26, 1999 (DE) .......................... 199 24 029

(51) Int. Cl.[7] .............................. G01M 15/00
(52) U.S. Cl. ..................... 73/118.1; 73/23.31
(58) Field of Search ............................ 73/23.31, 23.32, 73/118.1, 116, 117.2, 117.3; 60/272, 276, 277

(56) References Cited

U.S. PATENT DOCUMENTS

| 5,592,815 | A | | 1/1997 | Jelden et al. ................. 60/274 |
| 5,930,993 | A | * | 8/1999 | Kammann et al. ............ 60/277 |
| 6,009,742 | A | * | 1/2000 | Balko ........................ 73/23.31 |
| 6,278,126 | B2 | * | 8/2001 | Kammann et al. ............ 60/277 |

FOREIGN PATENT DOCUMENTS

| DE | 43 15 278 A1 | * | 5/1993 |
| DE | 44 02 850 | * | 8/1994 |
| DE | 196 29 163 | * | 10/1997 |
| EP | 0 236 659 | | 9/1987 |

* cited by examiner

Primary Examiner—Eric S. McCall
(74) Attorney, Agent, or Firm—Crowell & Moring LLP

(57) ABSTRACT

A process for monitoring the operation of a system for the aftertreatment of exhaust gas utilizes respective temperature sensors assigned to catalysts in the exhaust gas system. In addition, a sensor for detecting the NOx content in the exhaust gas is assigned to a reduction catalyst. The detected values, or functions thereof, are in each case compared with the definable reference values and when these definable limit values are exceeded, a corresponding defect information is triggered.

10 Claims, 3 Drawing Sheets

PROCESS FOR MONITORING OPERATION OF AN EXHAUST GAS TREATMENT SYSTEM

BACKGROUND AND SUMMARY OF THE INVENTION

This application claims the priority of 199 24 029.9, filed May 26, 1999, the disclosure of which is expressly incorporated by reference herein.

The present invention relates to the aftertreatment of exhaust gases in internal-combustion engines.

The problems of the aftertreatment of exhaust gases were explained in a comprehensive overview in *Bosch/Automotive Handbook,* 22nd Edition (ISBN 3-18-419122-2) in the chapter "Exhaust Gases of Spark Ignition Engines" (Page 486, and on). During the combustion of the air-fuel mixture in internal-combustion engines, a number of combustion products are formed. In addition to the non-toxic main constituents, such as nitrogen, carbon dioxide and water vapor, the exhaust gas also contains a number of less tolerable secondary constituents, including carbon monoxide (CO), nitrogen monoxide (NO), nitrogen dioxide ($NO_2$), hydrocarbons (HC) and solid matter. Nitrogen monoxide is colorless, odorless and tasteless and, in air, is slowly converted to $NO_2$. In its pure form, $NO_2$ is a pungent toxic gas which, at a higher concentration, can irritate the mucous membranes. (A combined term for NO and $NO_2$ is normally nitrogen oxides NOx.) Hydrocarbons are contained in the exhaust gas in a great variety and, in the presence of nitrogen oxide and sunlight, form oxidants.

This exhaust gas mixture reaches the exhaust gas system where, as a rule, it is first introduced into an oxidation catalyst, which oxidizes the hydrocarbons to carbon dioxide and water and oxidizes the carbon monoxide to carbon dioxide. Simultaneously, nitrogen monoxide NO is also oxidized to nitrogen dioxide.

To reduce harmful fractions in the exhaust gas, a number of measures are known for influencing the exhaust gas composition. These measures can essentially be divided into engine-related measures and measures concerning the aftertreatment of exhaust gases. Since the present invention relates to measures for the aftertreatment, the engine-related measures will not be explained here in detail.

The possibilities for the aftertreatment of exhaust gas include thermal afterburning and catalytic afterburning. The catalysts used for the catalytic afterburning normally consist of a substrate material with an active coating which promotes the chemical conversion particularly of the harmful constituents of the exhaust gas. As an alternative, so-called full-extrusion catalysts may also be used.

Because the efficiency of the catalyst depends essentially on its operating temperature, catalysts tend to be installed close to the engine, which shortens the time required to reach the operating temperature, so that optimal efficiency is rapidly achieved. However, at the same time, installation close to the engine has the disadvantage of a high thermal stressing of the catalyst. Also, in the case of a malfunction of the engine, such as ignition failures in the case of spark ignition engines, because of the conversion of the unburnt fuel taking place in the catalyst, the temperature of the catalyst may rise so high that it is destroyed due to melting of the substrate material. As a rule, this is prevented by the use of reliable and maintenance-free ignition systems.

Oxidation catalysts, which essentially oxidize the carbon monoxide CO and the hydrocarbons HC, are known. They are operated either by a lean engine operation or by an additional air injection with an excess of air or in the leaner-than-stoichiometric diesel exhaust gas, such that carbon monoxide and the HC constituents are oxidized. Furthermore, reduction catalysts are known which reduce the nitrogen oxides in the exhaust gas. The series connection of the oxidation and reduction catalyst with an air injection between the two catalysts has the advantage that NOx as well as HC and CO can be reduced.

The operating principle and the method of operation of a reducing agent catalyst, as well as a method and apparatus for metering a reducing agent into a nitrogen-oxide-containing exhaust gas for reducing these constituents in the reduction catalyst connected on the output side, are known. See, for example, German Patent Document DE 43 15 278 A1.

One object of the invention is to provide a process for monitoring the operation of an exhaust gas treatment system that includes a series connection of an oxidation catalyst and a reduction catalyst, which process can monitor the operation, and thus the reliability, of each catalyst individually or both can be monitored together.

The operation of the oxidation catalyst is permanently impaired by an excessive thermal stressing at exhaust gas temperatures that are too high, which results in a thermal aging. Decisive factors with respect to the extent of the aging are the frequency and the magnitude of the critical temperatures above a reference value. By adding up, or accumulating over time, the temperatures above the reference value, information can be obtained concerning the thermal stressing of the oxidation catalyst. That is, the sum thus formed is compared with a definable limit value; when the sum exceeds the limit, a defect report takes place. The system thus permits very rapid communication to the driver, visually and/or acoustically, concerning the critical condition of the oxidation catalyst. Testing of the reduction catalyst by detecting the nitrogen oxide (NOx) or ammonia (NH3) values in the exhaust gas downstream of the catalyst results in differentiated information concerning the operability of this reduction catalyst or of the reducing agent metering device.

The process according to the invention as described above can be performed by means of respective temperature sensors assigned to the catalysts in the exhaust gas system, as well as sensors for detecting NOx content of the exhaust gas assigned to the reduction catalyst. The provision of two temperature sensors, one arranged upstream of the oxidation catalyst and one downstream of it, has the advantage that, by comparing the temperatures in front of and behind the oxidation catalyst, significantly more precise information can be provided concerning the actual temperature in the oxidation catalyst (oxi-cat). Because each temperature sensor can also be evaluated separately, continued monitoring of the operability of the oxidation catalyst is ensured, even in the event of the failure of a temperature sensor.

The detection of the NOx and/or $NH_3$ concentration in the exhaust gas behind the reducing agent catalyst, and comparison of the NOx concentration at a defined operating point of the internal-combustion engine with a stored control value of the NOx content has the advantage that information can be obtained very rapidly concerning the exhaust gas composition. When an increase of the NOx concentration is detected, a defect report is made to the driver, preferably by a visual and/or acoustic information provided in the instrument cluster. Simultaneously, a corresponding defect entry can take place in the control unit which can then be read out in a repair shop. Here, a detailed information can be stored, as, for example, which catalyst has caused the defect report or the amount of the maximum temperature in the oxidation catalyst or of the NOx or $NH_3$ concentration behind the reduction catalyst.

Other objects, advantages and novel features of the present invention will become apparent from the following detailed description of the invention when considered in conjunction with the accompanying drawings.

DETAILED DESCRIPTION OF THE DRAWINGS

Figure 1:
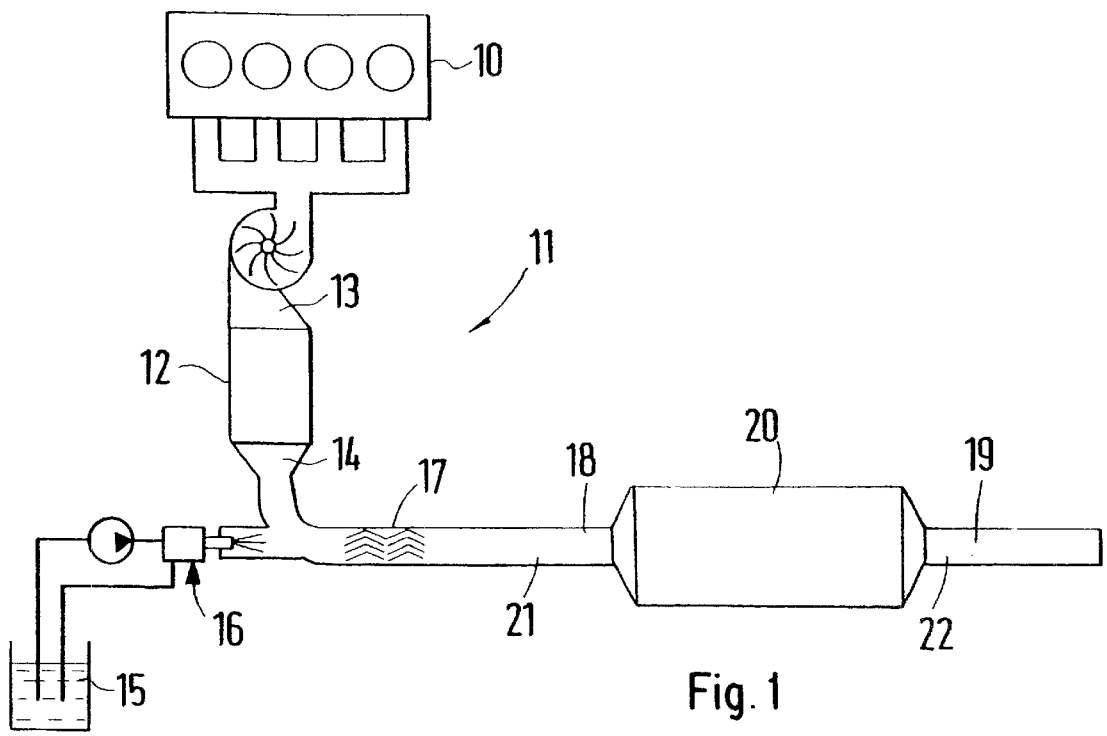
FIG. 1 is a view of the basic construction of an exhaust gas aftertreatment system with an oxidation catalyst (oxi-cat) and a reduction catalyst.

FIG. 1 is a basic diagram of the exhaust gas system of an internal-combustion engine, in which reference number 10 designates an engine block. Exhaust gas formed during combustion in the individual cylinders of the engine block 10, is carried off by way of the exhaust gas system 11, in which an oxidation catalyst (oxi-cat) 12 is situated in the immediate proximity of the engine block 10. A first temperature sensor 13 is arranged in the exhaust gas system 11 in front of the oxidation catalyst 12 for sensing the temperature Tact-v in front of the oxidation catalyst 12; and a second temperature sensor 14 is arranged behind the oxidation catalyst for sensing the temperature Tact-n behind the oxidation catalyst 12. A reduction catalyst 20 is situated in a series connection with the oxidation catalyst 12, with a temperature sensor 18 arranged in front of the reduction catalyst, and a temperature sensor 19 arranged behind it. Likewise, in front of the reduction catalyst 20, a first exhaust gas sensor 21 is arranged for detecting the crude emission of nitrogen oxides E-NOx. A second exhaust gas sensor 22 is arranged in the exhaust gas system behind the reduction catalyst and senses the NOx and NOx/NH3 concentration of the exhaust gas.

A reducing agent tank 15, also assigned to the exhaust gas system 11, adds reducing agent to the exhaust gas in a targeted manner by way of a reducing agent feeding device 16 arranged in the exhaust gas system 11 between the oxidation catalyst 12 and the reduction catalyst 20. A mixer 17 in the exhaust gas system 11 provides a homogeneous mixture of the exhaust gas with the reducing agent 15.

Before explaining the process according to the invention, it should be noted that the actual combustion has a significant influence on the composition of the exhaust gas. In the case of spark ignition engines, engine-related measures which influence the course of the combustion (and thus the exhaust gas composition) include mixture adjustment, mixture preparation, uniformity of distribution, exhaust gas recirculation, control of valves, the compression ratio, the combustion space design, the ignition system itself and, for example, the crankcase breathing. In the case of diesel engines, such measures include the targeted design of the turbulences of the combustion space charge, the geometry of the combustion space, the timely feeding of fuel and regulation of the injection point in time, the optimal atomization of the fuel and the geometry of the injection nozzles, the regulating of the air excess in the combustion space by way of variable charging as well as the regulating of the exhaust gas recirculation. These methods are well known, and will not be explained in detail herein. However, it is important that none of these measures alone achieves an optimal result; rather, all measures to be taken must be coordinated with one another for an exhaust gas which is as free of harmful substances as possible.

Figure 2:
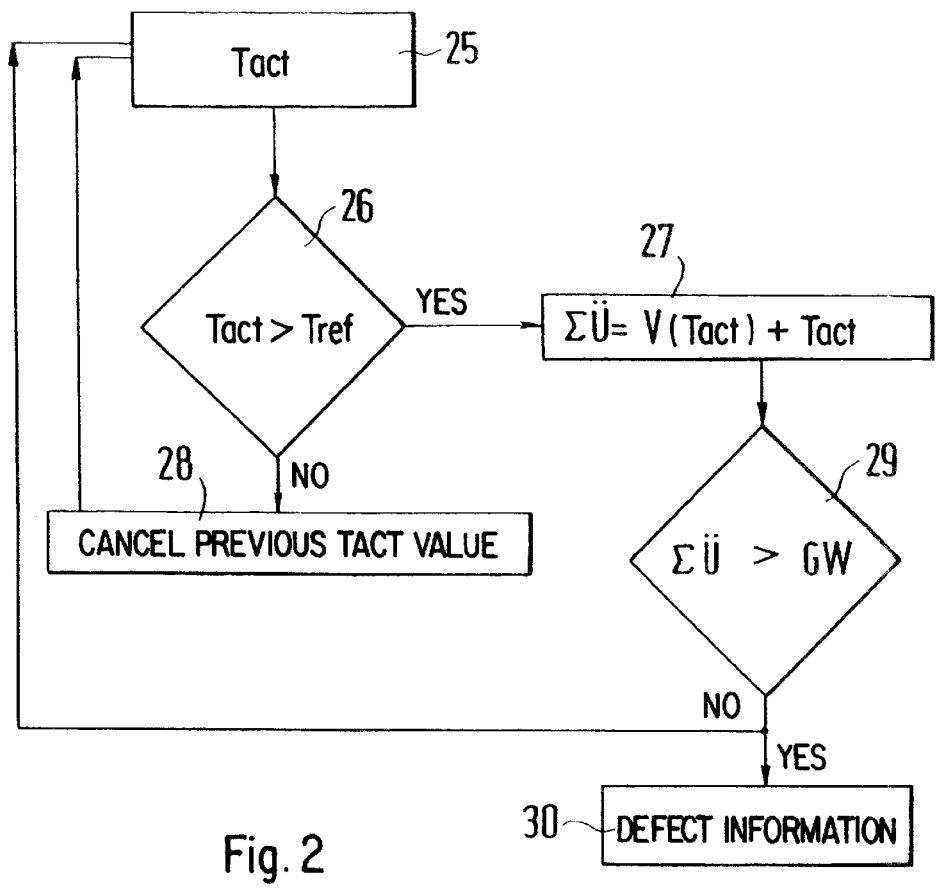
FIG. 2 is a flow chart for determining a malfunctioning of the oxidation catalyst by means of a temperature sensor.

Referring to FIG. 2, monitoring of the oxidation catalyst by means of a single temperature sensor, arranged either in front of or behind the oxidation catalyst, will be described. In a first operating step 25, the actual temperate Tact is detected, either in front of the oxidation catalyst via the temperature sensor 13, or behind the oxidation catalyst via the temperature sensor 14. Then, in step 26, the detected actual temperature Tact is compared with a definable reference value Tref (Tact>Tref?), which is optionally acted upon by engine operating values and weighting factors. (Thus, for example, when the exhaust gas throughput is higher, a higher weighting of the critical temperature Tref may take place.) A "no" output in step 26 indicates that the actual measured temperature value Tact is below the definable reference value Tref of the exhaust gas temperature; this leads to an operating step 28 in which the last measured actual temperature value Tact is canceled, and the next actual temperature value Tact is then detected once again in operating step 25.

On the other hand, if the actually detected temperature value Tact exceeds the definable reference value in step 26, in operating step 27, the actually detected temperature value (Tact) is added to the accumulated temperature values V(Tact) which were already detected in the past (and which were above the reference value), and a sum of all exceeding events Ü is formed from all these values. In a subsequent query 29, it is checked whether the computed sum ΣÜ is larger than a definable limit value GW for the defect report. If not, the no output leads back to the start of the process to step 25, and the next temperature value is detected. If, in contrast, the answer to query 29 was yes (that is, the formed sum ΣÜ is greater than the permissible limit value GW), a defect indication is generated in operating step 30, for example, either visually and/or acoustically. Advantageously, a corresponding defect indication can also be filed in the memory, so that, when a repair shop is visited, more exact data may be read out concerning the occurred defects. It is possible, for example, that the operating point at which the increased temperature was measured is simultaneously stored.

Figure 3:
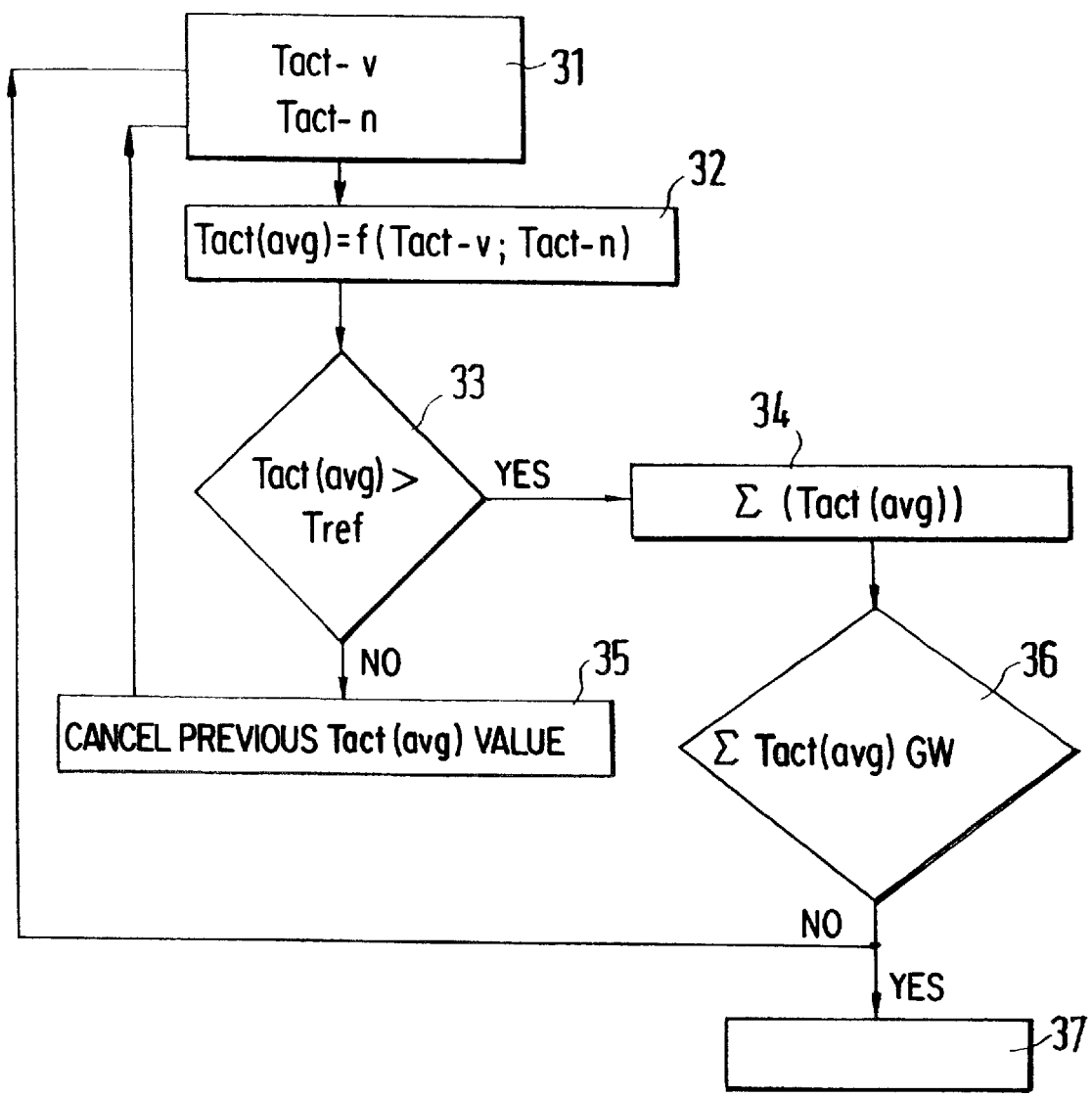
FIG. 3 is a flow chart for determining a malfunctioning of the oxidation catalyst by means of two temperature sensors.

FIG. 3 shows the process for checking the oxidation catalyst using measured actual temperature values of two temperature sensors, a first sensor 13 arranged in the exhaust gas system 11 in front of the oxidation catalyst and a second sensor 14 arranged in the exhaust gas system behind the oxidation catalyst (step 31). In this case, the first temperature sensor 13 in front of the oxidation catalyst takes into account exhaust gas temperatures which may cause a thermal aging at the catalyst, while the temperature sensor 14 behind the oxidation catalyst takes into account possible burning off of soot and/or embedded hydrocarbons in the oxidation catalyst. (The burning-off of these substances may be triggered after an extended operation at low exhaust gas temperatures, below the working temperature of the oxidation catalyst, by an increase of the exhaust gas temperature.

In a subsequent operating step 32, by a weighting of the two detected temperatures in front of and behind the oxidation catalyst, an average catalyst temperature Tact (avg) is computed; Tact(avg)=f(Tact-v; Tact-n). In the subsequent query, (analogous to operating step 26 of FIG. 2), this average catalyst temperature Tact(avg) is compared with a definable reference temperature Tref. Also the further operating steps and queries are carried out analogously to the flow chart of FIG. 2 and will not be discussed here again separately.

A significant difference between the process according to FIG. 3 and that illustrated in FIG. 2 is that a value for the average catalyst temperature is determined from the temperatures in front of and behind the oxidation catalyst on which the further process steps are based. Thus, when the average catalyst temperature exceeds the reference temperature in query 33, in operating step 34, the sum of the exceeding events is formed by adding to it the last excessive temperature value. Otherwise, the last determined value for the average catalyst temperature is canceled in operating step 35. The sum $\Sigma$ (Tact(avg)) formed in operating step 34 is compared in query 36 with a definable limit value GW. According to the result of the comparison, either a jump takes place to the start of the process or a defect information is obtained in operating step 37.

The reducing agent metering unit 16 illustrated in FIG. 1 adds to the exhaust gas behind the oxidation catalyst 12 either an aqueous urea solution, solid urea, an NH3-containing gas or an ammonia-forming substance. When the internal-combustion engine and the reduction catalyst operate properly, the nitrogen oxide concentration is known at defined operating points OP1 and OP2. By comparing this expected (normal) nitrogen oxide concentration and the actual measured nitrogen oxide concentration, a corresponding malfunctioning can be recognized, and a defect information emitted, when the measured value exceeds the expected value. Essentially, a defective reduction catalyst, when the reducing agent metering is correct, converts less NOx so that the unused reducing agent passes through in greater quantity, and will then be present downstream of the reduction catalyst at a higher concentration fraction. In contrast, in the event of defective reducing agent metering, the NOx is not properly converted and the NOx concentration in the exhaust gas will rise.

Figure 4:
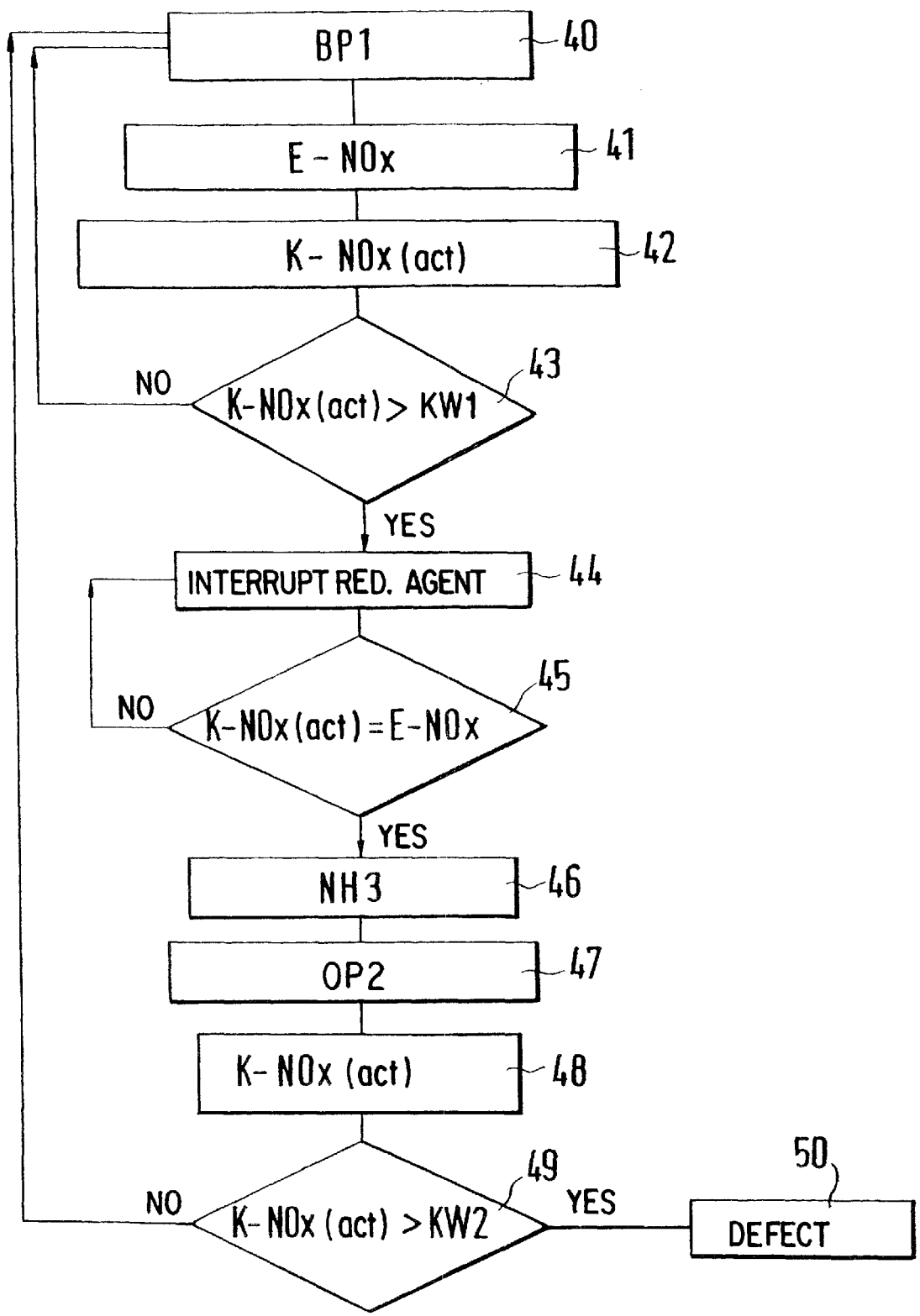
FIG. 4 is a flow chart for determining a malfunctioning of the reduction catalyst.

FIG. 4 is a flow chart for examining the operability and the method of operation of the reduction catalyst. First, it is checked in a first operating step 40 whether a defined operating point OP1 is present or the actual operating point is determined. An NOx concentration in the exhaust gas can be assigned to each operating point, these values normally being determined in the application and being stored in a memory by means of a characteristic diagram. Subsequently, in an operating step 41, the crude emission of the engine E-NOx in front of the reduction catalyst is detected, and, in a further operating step 42, the actual emission is measured behind the reduction catalyst K-NOx(act).

In a query 43, it is determined whether the NOx concentration in the exhaust gas behind the reduction catalyst is higher than a definable control value KW1 (K-NOx(act) >KW1). If not, the "no" output of query 43 leads back to the start of the process to operating step 40. However, if query 43 was answered "yes", (that is, the NOx content in the exhaust gas is higher than the definable control value (KW1)), in a subsequent operating step 44, addition of the reducing agent is interrupted, and thereafter, in step 45, it is determined whether the nitrogen oxide concentration behind the reduction catalyst K-NOx(act) is approximately equal to the crude emission of the engine E-NOx. If not, the "no" output leads back to operating step 44, where the NH3 metering remains interrupted, so that the reducing agent in the reduction catalyst is reduced completely.

If the answer to query 45 was yes (the NOx concentrations upstream and downstream of the reduction catalyst are identical), metering of the reducing agent NH3 is activated again in operating step 46. In a subsequent operating step 47, a defined operating point OP2 is awaited, and then, in operating step 48, the crude emission of nitrogen oxide of the engine E-NOx upstream of the reduction catalyst and the actual nitrogen oxide concentration downstream of it, K-NOx(act), are measured again. If, in a subsequent query 49, the NOx concentration behind the reducing agent catalyst is higher than a definable control value, a defect indication is generated in operating step 50. If no increased NOx concentration was determined, the no output of query 49 leads back to the start of the process.

In addition, at query 45, a sensor test can take place. When the NH3 metering is not active, measured values of the NOx sensors can be compared with values filed in the characteristic diagram. In the event of excessive deviation between the value supplied by the sensor and that of the characteristic diagram, a sensor defect usually exists, which in this manner can also be rapidly detected. Furthermore, indirect monitoring of the oxidation catalyst is possible. That is, in the case of a defective oxidation catalyst, NOx conversion is reduced at low temperatures even though the reduction catalyst has not aged, because normally the reduction catalyst has a higher activity at low temperatures and when the oxidation catalyst is connected at the input side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for monitoring operation of an engine exhaust gas aftertreatment system having an oxidation catalyst arranged in an exhaust gas path, a reduction catalyst arranged in the exhaust gas path downstream of the oxidation catalyst, at least one temperature sensor arranged in said exhaust gas path adjacent said oxidation catalyst, and an exhaust gas sensor arranged in the exhaust gas path downstream of the reduction catalyst, said processing comprising:

said temperature sensor detecting actual temperature values of exhaust gas entering or exiting said oxidation catalyst;

comparing detected actual temperature values with a reference temperature;

accumulating detected actual temperature values which exceed the reference temperature, to form a sum thereof;

comparing said sum with a predetermined limit value;

generating a first defect indication when the sum exceeds the limit value;

said exhaust gas sensor detecting actual nitrogen oxide concentration in the exhaust gas;

comparing detected nitrogen oxide concentration with predetermined first and second permissible control values for nitrogen oxide in the exhaust gas; and generating a second defect indication as a function of results of said comparison of detected nitrogen oxide concentration.

2. The process according to claim 1, wherein said exhaust gas aftertreatment system further comprises a reducing agent metering device disposed between the oxidation catalyst and the reduction catalyst; and wherein said process further comprises:

when an actual nitrogen oxide concentration detected by the exhaust gas sensor is higher than the first control value, addition of reducing agent to the exhaust gas by the metering device is interrupted until no reducing agent is stored in the reduction catalyst;

thereafter, the metering device is controlled to add a defined amount of reducing agent, such that NOx to be expected at the actual operating point is substantially completely converted in the reduction catalyst;

if nitrogen oxide concentration detected by the exhaust gas sensor continues to increase, the reduction catalyst is recognized as operating defectively; and if NH3 concentration increases, the reducing agent metering device is recognized as operating defectively.

3. The process according to claim 1, wherein the at least one temperature detection device comprises a first temperature sensor which detects exhaust temperature upstream of the oxidation catalyst, and a second temperature sensor which detects exhaust gas temperature downstream of the oxidation catalyst.

4. The process according to claim 3, wherein, based on detected temperatures upstream and downstream of the oxidation catalyst, an average catalyst temperature of the oxidation catalyst is determined.

5. The process according to claim 1, wherein the reference temperature is determined as a function of an operating point of said engine.

6. The process according to claim 1, wherein the first and second control values can assume the same value or different values.

7. The process according to claim 5, wherein two operating points can define the same operating range and different operating ranges of the engine.

8. A process for monitoring operation of an engine exhaust gas treatment system having an oxidation catalyst arranged in an engine exhaust gas path, comprising:

detecting actual temperature of said exhaust gas at at least one point in said exhaust gas flow path adjacent said oxidation catalyst;

comparing detected actual temperature values with a reference value;

accumulating detected actual temperature values which exceed the reference temperature, forming a sum thereof;

comparing said sum with a predetermined limit value; and generating a defect signal when the sum exceeds the limit value.

9. A process for monitoring operation of an engine exhaust gas treatment system according to claim 8, wherein:

said as least one point for detecting actual temperature comprises a first point upstream of said oxidation catalyst and a second point downstream of said oxidation catalyst; and said actual temperature comprises an average of temperatures detected at said first and second points.

10. A process for monitoring operation of an engine exhaust gas treatment system according to claim 9, wherein said reference temperature is determined as a function of an operating point of said engine.

* * * * *